US009683159B1

(12) United States Patent
Kemp et al.

(10) Patent No.: US 9,683,159 B1
(45) Date of Patent: *Jun. 20, 2017

(54) ADDITIVE FOR DRILLING FLUID USED AS A SEALING AGENT TO REDUCE SEEPAGE LOSS AND FLUID LOSS IN SUBTERRANEAN WELLBORES

(71) Applicant: WelDril Holdings, L.L.C., Muskogee, OK (US)

(72) Inventors: Nantelle P. Kemp, Muskogee, OK (US); Marwin K. Kemp, Muskogee, OK (US); Johnnie M. Kelley, Muskogee, OK (US); Graham A. Wilson, Muskogee, OK (US)

(73) Assignee: WELDRIL HOLDINGS, L.L.C., Tulsa, OK (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/668,712

(22) Filed: Mar. 25, 2015

Related U.S. Application Data

(60) Provisional application No. 61/969,887, filed on Mar. 25, 2014.

(51) Int. Cl.
C09K 8/00 (2006.01)
C09K 8/03 (2006.01)
C09K 8/42 (2006.01)

(52) U.S. Cl.
CPC ............. *C09K 8/032* (2013.01); *C09K 8/42* (2013.01)

(58) Field of Classification Search
CPC ............. C09K 8/03; C09K 8/42; C09K 8/426

USPC .......................................................... 507/140
See application file for complete search history.

(56) References Cited

U.S. PATENT DOCUMENTS

| | | | |
|---|---|---|---|
| 2,650,195 A | 8/1953 | Cardwell et al. | |
| 2,782,163 A | 2/1957 | Wilson | |
| 2,813,826 A | 11/1957 | Crowley et al. | |
| 3,657,134 A | 4/1972 | King et al. | |
| 3,766,229 A | 10/1973 | Turner et al. | |
| 3,788,406 A | 1/1974 | Messenger | |
| 4,039,459 A | 8/1977 | Fischer et al. | |
| 4,304,300 A | 12/1981 | Watson | |
| 4,411,802 A * | 10/1983 | Lester | C07C 309/00 166/275 |
| 4,479,806 A * | 10/1984 | Funk | C10L 1/32 44/280 |
| 4,652,606 A | 3/1987 | Slingerland | |
| 4,842,770 A | 6/1989 | Patel | |
| 5,337,824 A | 8/1994 | Cowan | |

(Continued)

OTHER PUBLICATIONS

Nediljka Gaurina-Medimurec, Laboratory Evaluation of Calcium Carbonate Particle Size Selection for Drill-In Fluids, Rudarsko-geolosko-naftni zbornik; vol. 14; str. 47-53; Zagreb, 2002; Faculty of Mining, Geology and Petroleum Engineering, University of Zagreb, Pierollijeva 6, HR-10000 Zagreb, Croatia.

(Continued)

*Primary Examiner* — Aiqun Li
(74) *Attorney, Agent, or Firm* — Head, Johnson, Kachigian & Wilkinson, PC

(57) ABSTRACT

An additive for drilling fluid used as a sealing agent to reduce seepage loss and fluid loss in subterranean wellbores. The additive includes ground bituminous coal having a selected particle size distribution and a median particle size added to drilling fluid at a selected rate.

8 Claims, 15 Drawing Sheets

(56) References Cited

U.S. PATENT DOCUMENTS

| | | | |
|---|---|---|---|
| 5,439,056 | A | 8/1995 | Cowan |
| 6,825,152 | B2 | 11/2004 | Green |
| 2010/0230164 | A1 | 9/2010 | Pomerleau |

OTHER PUBLICATIONS

Arunesh Kumar, Sharath Savari, Halliburton Lost Circulation Control and Wellbore Strengthening: Looking Beyond Particle Size Distribution AADE-11-NTCI-21; American Association of Drilling Engineers; Copyright 2011, AADE.

Geo Drilling Fluids, Inc. Calcium Carbonate (CaCO3) pp. 1 and 2 Newsletters published by Geo Drilling Fluids, Inc. / United States.

Calcium Carbonate, Glo Garb, Course / Medium / Fine sales@globaldrilling.in/Copyright 2008/Global Drilling Fluids & Chemicals Ltd. http://globaldrillchem.com/products/index/calcium-carbonate_3953.html.

Calcium Carbonate—Ground Calcite, Weatherford.com Copyright 2010 Weatherford International Ltd. Issued Feb. 2010.

Gilsonite: Comes of Age, VENews / Venture Chemicals, Inc. Aug. 1990 Venture Chemicals, Inc., P.O. Box 53631, Lafayette, LA 70505.

The Hole Solution Company, Sized Particles for Durable Sealing to Reduce Fluid Loss, Solid Solutions for Fluid Loss at High Temperatures, Sx-Plus(TM) Sun . . . The Hole Solution Company, Houston, TX http://wwww.sundrilling.com/sx-plus_drilling_mud_fluid_additive.php.

G-Seal Mi Swaco, A Schlumberger Company / Houston, TX / www.miswaco.slb.com 2011 M-1 LLC/FPB.0785.1103.R4 (E) Litho in U.S.A.

\* cited by examiner

Figure 13

| Additive | Fluid Properties of Bentonite Drilling Fluids | | | | | | | | | |
|---|---|---|---|---|---|---|---|---|---|---|
| | Additive, ppb | Bentonite, ppb | PV, dynes/cm2 | YP, lb/100ft2 | 10s gel, lb/100ft2 | 10m gel, lb/100ft2 | API, 30m, mL | Syringe test, mL | Syringe test, penetration, mL | API Modified, 30 m, mL |
| 16.9 ppb Bentonite | 0 | 16.9 | 6.4 | 5.2 | 1.3 | 9.5 | 17.5 | 20.0 | 24.0 | |
| MG Coarse | 4 | 16.9 | 7.8 | 5.0 | 4.9 | 8.2 | | 6.0 | 24.0 | 48.5 |
| MG Medium | 4 | 16.9 | 6.7 | 5.3 | 1.0 | 8.1 | | 1.5 | 24.0 | 60.0 |
| MG Fine | 4 | 16.9 | 4.7 | 2.7 | 0.5 | 5.1 | 14.0 | 0.0 | 24.0 | 48.0 |
| CG | 4 | 16.9 | | | | | | 22.0 | 24.0 | 140.0 |
| Treated Columbian natural asphalt | 4 | 16.9 | 6.8 | 6.7 | 2.1 | 9.5 | | 0.5 | 24.0 | 37.0 |
| Treated uintaite (1) | 4 | 16.9 | 6.9 | 6.7 | 2.0 | 10.3 | 17.0 | 10.5 | 24.0 | 57.0 |
| Treated uintaite (2) | 4 | 16.9 | 7.1 | 6.9 | 2.1 | 10.0 | | 0.0 | 22.0 | 45.0 |
| 22.5 ppb Bentonite CLS | 0 | 22.5 | 5.8 | 1.7 | 0.2 | 1.4 | 13.7 | 28.0 | 24.0 | 154.0 |
| MG Fine | 5 | 22.5 | 8.1 | 4.1 | 1.1 | 9.4 | 12.4 | 3.0 | 24.0 | 24.7 |
| Treated Columbian natural asphalt | 5 | 22.5 | 5.9 | 1 | 0 | 0.1 | 10.7 | 1 | 24 | 39.5 |
| Treated uintaite (2) | 5 | 22.5 | 5.9 | 1.5 | 0.2 | 0.6 | 12.3 | 6.5 | 24.0 | 61.5 |

Figure 14

| Additive | Fluid Properties of 1 ppb X-C Polymer/5% KCl Drilling Fluids | | | | | | | | | |
|---|---|---|---|---|---|---|---|---|---|---|
| | Additive, ppb | X-C Polymer, ppb | PV, dynes/cm2 | YP, lb/100ft2 | 10s gel, lb/100ft2 | 10m gel, lb/100ft2 | API, 30m, mL | Syringe test, mL | Syringe test, penetration, mL | API Modified, 30 m, mL |
| 1 ppb X-C/5%KCl | 0 | 1 | 4.1 | 7.5 | 2.3 | 2.5 | 18.5 | 23.5 | 24.0 | 146.0 |
| MG Coarse | 5 | 1 | 5.3 | 7.5 | 11.2 | 3.2 | | 0.0 | 23.0 | 27.0 |
| MG Medium | 5 | 1 | 5.5 | 7.7 | 3.1 | 3.3 | | 1.0 | 24.0 | 17.0 |
| MG Fine | 5 | 1 | 4.9 | 8.3 | 3.2 | 3.5 | 17.1 | 0.0 | 10.0 | 20.0 |
| Treated Columbian natural asphalt | 5 | 1 | 4.5 | 7.1 | 2.2 | 2.7 | | 0.0 | 24.0 | 10.5 |
| Treated uintaite (1) | 5 | 1 | 4.5 | 8.4 | 2.7 | 2.8 | 19.2 | 24.0 | 24.0 | 68.0 |
| Treated uintaite (2) | 5 | 1 | 4.3 | 7.6 | 2.4 | 2.5 | 22.0 | 0.0 | 15.0 | 42.5 |

Figure 15

| Additive | Fluid Properties of 7.7 ppg Diesel Oil-Based Systems | | | | | | | | |
|---|---|---|---|---|---|---|---|---|---|
| | Additive, ppb | PV, dynes/cm2 | YP, lb/100ft2 | 10s gel, lb/100ft2 | 10m gel, lb/100ft2 | API, 30m, mL | Syringe test, mL | Syringe test, penetration, mL | API Modified, 30 m, mL |
| 7.7 ppg Oil-Based | 0 | 15.2 | 11.5 | 5.6 | 5.8 | 2.7 | 22.0 | 24.0 | 140.0 |
| MG Fine | 2 | 15.6 | 11.1 | 6.0 | 6.2 | 2.7 | 2.0 | 24.0 | 82.3 |
| MG Fine | 4 | | | | | | 0.0 | 23.0 | 34.7 |
| Untreated uintaite | 2 | 15.4 | 11.2 | 5.7 | 5.9 | 2.7 | 8.0 | 24.0 | 137.0 |
| Untreated uintaite | 4 | | | | | | 0.0 | 21.0 | 84.0 |
| Columbian natural asphalt | 2 | 15.7 | 10.9 | 5.6 | 6.0 | 2.8 | 7.5 | 24.0 | 137.0 |

ADDITIVE FOR DRILLING FLUID USED AS A SEALING AGENT TO REDUCE SEEPAGE LOSS AND FLUID LOSS IN SUBTERRANEAN WELLBORES

CROSS REFERENCE TO RELATED APPLICATIONS

This application claims priority to U.S. Provisional Application Ser. No. 61/969,887, filed Mar. 25, 2014, which is incorporated herein by reference.

BACKGROUND OF THE INVENTION

1. Field of the Invention

The present invention relates to an additive for drilling fluid used as a sealing agent to reduce seepage loss and to reduce fluid loss in subterranean wellbores.

2. Prior Art

Drilling fluids or drilling "muds" serve a number of functions during the drilling of an oil or gas well. The fluids lubricate and cool the drill bit and carry drill cuttings to the surface. In addition, the drilling fluid can have major interactions with the wellbore, either helping to stabilize the hole or creating problems with the wellbore.

A myriad of different fluids have been developed in the past to fulfill the functions required when drilling. The two basic types are water-based and oil-based. The water-based fluids can be further divided into several categories, two of which are bentonite containing fluids and polymer systems.

Drilling fluids interact with the formations being drilled. If the formations are at all porous or fractured, the drilling fluid can migrate into them by capillary action and slow percolation (seepage loss). While there are several ways that the fluid interacts with the formation, one key to preventing down hole problems is physically plugging the pores or fractures to prevent or reduce fluid migration.

The material used to plug the openings needs to be sized appropriately for the size of opening to be plugged. Fluid migration of drilling fluids into formations falls into three general categories: fluid loss, seepage loss, and lost circulation. Fluid loss is the migration of the liquid phase of the drilling fluid into the formation. The very fine particles in drilling fluids are designed to form a filter cake on the surface of the formation which prevents solid migration into the formation, but some liquid may still penetrate, if more slowly.

If the formations are fractured or have large holes or vugs, the filter cake may not be sufficient to prevent liquid and/or entire drilling fluid from entering the formation. If so much drilling fluid is being lost that little or no drilling fluid is being returned to the earth's surface, the situation is described as "lost circulation". In this circumstance, very large particles may be required to plug the formation.

When the formations being drilled are very porous or contain small fractures, more fluid may be lost than would be expected with ordinary fluid loss, but less than with lost circulation. This situation is termed "seepage loss".

The present invention is directed to an additive for drilling fluid composed of bituminous coal having a selected particle size distribution and a median particle size which is added to drilling fluid at a selected rate.

Products Used for Sealing:

A variety of products have been used to provide sealing in drilling fluids. One of the most common is calcium carbonate (CaCO3) because it is acid soluble. Acid solubility is important when drilling a producing formation because the CaCO3 can be removed with acid once production is desired. A number of companies supply CaCO3 in a variety of particle sizes. A few examples are CalCarb-Titan 200 and CalCarb 80 from Geo Drilling Fluids, Inc. (see http://www.geodf.com/store/geodf_products/4.pdf), Glo Carb in extra fine, fine, medium, and coarse from Global Drilling Fluids & Chemicals LTD (see http://globaldrillchem.com/products/index/clacium-carbonate_3953.html), and Calcium Carbonate in fine, medium, and coarse from Weatherford (see www.weatherford.com/weatherford/groups/web/documets/weatherfordcorp/wft126333.pdf).

Other sealing products fall in the category of asphaltites. One of these mined products is found in the Uintah Basin of Utah and has the mineral name uintaite. The product can be treated to make it more dispersible in water-based fluids. The untreated uintaite is sold commercially as Gilsonite®, GSX-601®, and Gilsonite GM-P®. The treated uintaite is sold commercially as Treated Gilsonite®, GSX-509®, and Gilsonite DG-P®. Similar natural asphalts are mined in Columbia and sold commercially as Gilsocol GP® (untreated) and Gilsocol DG® (treated).

Graphite is another product used in drilling fluids. It is primarily used as a lubricant, but is also used to reduce fluid loss. One example is SX-Plus from Sun Drilling (see http//www.sundrilling.com/SX-Plus_drilling_mud_fluid_additive.php). Graphite is also available from other companies such as M-I Swaco (G-Seal) (see http://www.slb.com/~/media/Files/miswaco/product_sheets/G-SEAL.pdf).

Requirements for Sealing:

Several factors are involved in achieving sealing during the drilling operation. Among the most critical factors are the total volume of solids and the size distribution of the particles compared to the size of the formation pores or fractures to be sealed. Other factors include the nature of the drilling fluid, the shape of the particles, and the amount and types of polymers in the system.

Generally speaking, the more particles present in the drilling fluid, the easier it is to obtain sealing. Thus, high-solid fluids such as bentonite-containing muds or weighted muds will seal more easily than low-solid fluids such as polymer systems or unweighted muds. Systems such as an X-C polymer fluid with no drill solids do not seal well at all. One rule of thumb proposed by Abrams stated that the concentration of bridging solids should be at least 5% by volume. See Abrams, A., "Mud Design to Minimize Rock Impairment Due to Particle Invasion", JPT (May 1977) 586. Under ideal conditions, Dick et al. found that sealing would occur at lower volumes. See Dick, M. A., Heinz, T. J., Svoboda, C. F., and Aston, M., "Optimizing the Selection of Bridging Particles for Reservoir Drilling Fluids", SPE 58793, 2000 SPE International Symposium on Formation Damage, Lafayette, La., 23-24 Feb. 2000.

Abrams also proposed that the median particle size of the bridging particles should be equal to or slightly greater than 1/3 the median pore size of the formation. Thus, to seal porous sandstones with large pore sizes, larger bridging particles would be required than for less porous rocks with much smaller pore sizes. The size $D_{90}$ is defined as the particle size at which 90% of the particles are smaller than that size. Another sizing theory proposed by Hands et al. suggested that the $D_{90}$ of the bridging particles should be equal to or less than the pore size of the rock. See Hands, N. et al., "Drill-In Fluid Reduces Formation Damage, Increases Production Rates", Oil and Gas Journal (July 1998) 13.

As mentioned earlier, a variety of materials have been used to control fluid losses. For example, in U.S. Pat. No. 5,004,553, House et al. describes the use of ground oat hulls alone or in combination with ground corn cobs, hydrophobic organophilic water wettable cotton, ground citrus pulp, and ground cotton burrs. The oat hulls in the House patent were specified to be 95% less than 590μ and 90% greater than 75μ. The other materials used in combination with the oat hulls were 75% less than about 250μ. These particle size distributions would be significantly larger than any of the mud grade products described in the present invention. It is important to note that the House patent does not mention the use of coal of any variety.

Pomerleau (U.S. Patent Publication No. 2010/0230164) addressed lost circulation, seepage loss, and fluid loss control. The patent describes the use of ground pumice, barium, dolomite, anthracite or a combination of these materials in drilling fluids. The patent covers a very broad range of particle sizes (between 100 and 4,000 microns) and an extremely wide range of concentrations (0.01 to 300 ppb). While the patent does suggest anthracite as one possible additive, it does not mention bituminous coal which is softer than anthracite and results in a very different particle size distribution when processed through a mill. Further, as will be set forth in detail, the products in the present invention have a much more restricted particle size range and concentration range.

Messenger (U.S. Pat. No. 3,788,406) describes the use of coal in a high concentration slurry (a "pill") to control lost circulation. Generally, lost circulation requires much larger particles than would be used to control seepage loss. No specific type of coal is mentioned and the particle size range (75 to 4760μ) is much broader than the products described in the present invention. Such a pill would not be suitable for the present seepage loss or a fluid loss situation.

Cardwell et al. (U.S. Pat. No. 2,650,195) describes a method of using resin to coat particles to prevent loss of fluid into thief formations. This again is a lost circulation rather than seepage loss situation and as such, the particles discussed are much larger than the products in the present invention. Coal, coke, cinders, and nut shells are mentioned as possible filler materials, but the type of coal is not specified.

Notwithstanding the foregoing, it would be desirable to provide an additive for drilling fluid used as a sealing agent to reduce seepage loss and fluid loss with a readily available material with a selected particle size distribution and a median particle size having improved efficiency.

SUMMARY OF THE INVENTION

The present invention is directed to an additive for drilling fluid used as a sealing agent to reduce seepage loss and fluid loss in subterranean wellbores.

The additive is composed of ground bituminous coal having a selected particle size distribution and a median particle size which is added to the drilling fluid at a selected rate.

Figure 12:
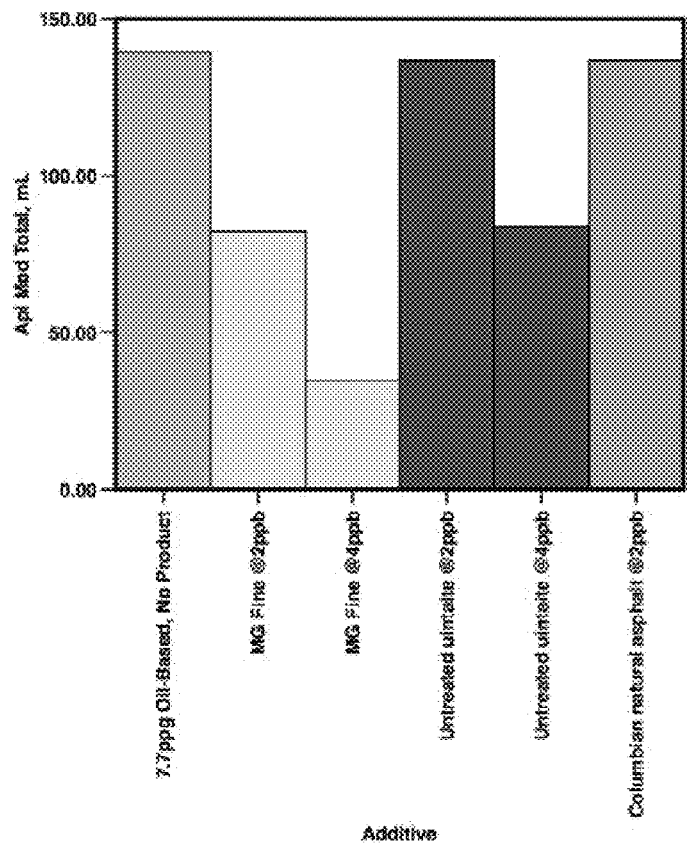

Fluid 11 is a graph or chart showing results of fluid expelled in a syringe fluid loss test in a diesel-oil based drilling fluid;

FIG. 12 is a graph or chart showing results of fluid expelled in a modified API modified fluid loss test for a diesel-oil based drilling fluid;

FIG. 13 is a table showing the fluid properties of bentonite drilling fluids;

FIG. 14 is a table showing the fluid properties of polymer/potassium chloride drilling fluids; and FIG. 15 is a table showing fluid properties of diesel-oil based systems.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

As set forth in this description and in the drawings, the following codes are employed to refer to additives of the present invention having selected particle size as follows:

Code Table

CG—cement grade additive

MG Coarse—mud grade coarse grind additive

MG Medium—mud grade medium grind additive

MG Fine—mud grade fine grind additive

In laboratory tests conducted for sealing which will be described herein, 20/40 mesh sand was used for one test and 30/40 mesh sand for the other test. In these mesh sizes; the largest particles will be about 850μ and 600μ, respectively. The largest pore sizes for these sands can be calculated to be approximately 470μ and 350μ, respectively. Based on a measured permeability of 119 Darcies (a measure of permeability), the median pore size for the 20/40 sand can be calculated to be around 345μ.

Figure 1:
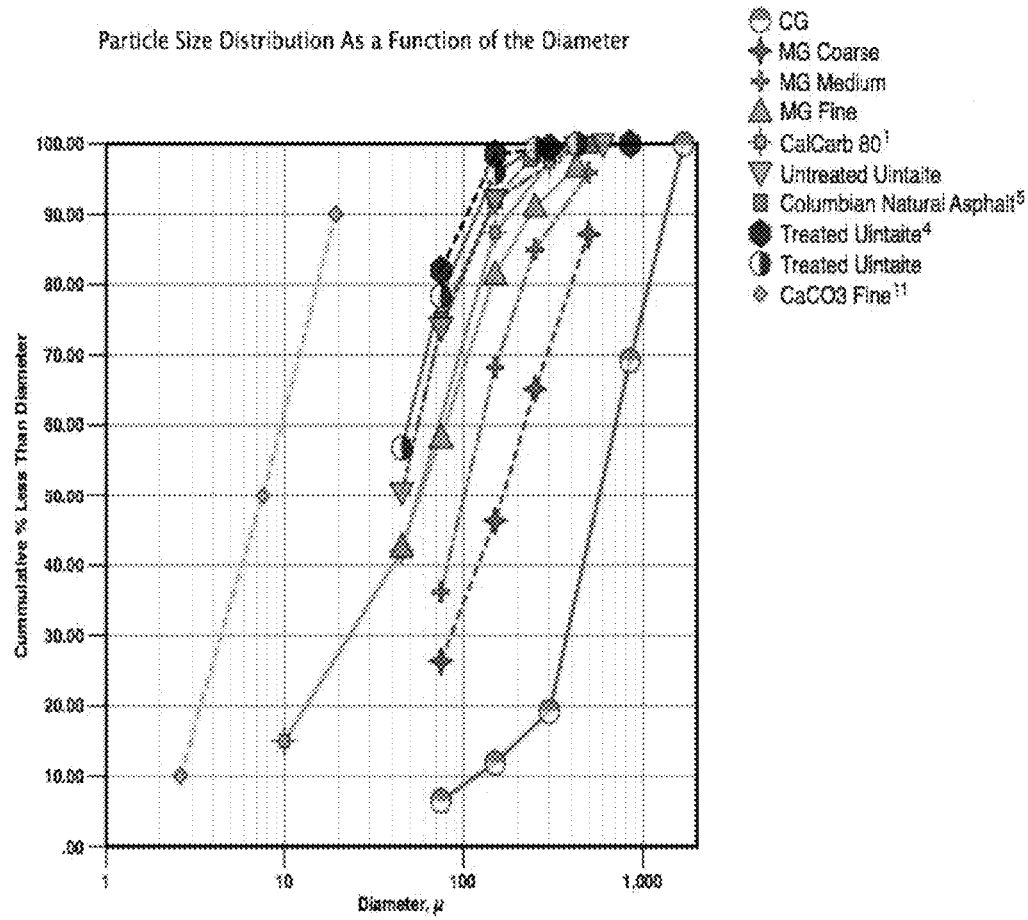
FIG. 1 is a graph or chart showing particle size distribution for various drilling fluid additives including additives of the present invention used as a sealing agent to reduce seepage and fluid loss.

FIG. 1 is a chart plot of particle size distribution for several different additives including those of the present invention. Those to the right in the chart plot have larger sized particles than those to the left. The particle size nominal diameter is shown on the X axis while the cumulative % less than the nominal diameter is shown on the Y axis.

Thus, the CaCO3 fine additive (see Gaurina-Medimurec, N., "Laboratory Evaluation of Calcium Carbonate Particle Size Selection for Drill-In Fluids", Rudarsko-geolosko-nafinizbornik (2002), Vol. 14, pages 47-53) is far to the left while the CG additive is far to the right. The uintaite and natural asphalts are all to the left of the MG grinds used in the tests, meaning that their particle sizes are generally significantly smaller than the other grinds. The uintaites and natural asphalts are similar in size distribution to each other. The CalCarb 80 is more nearly equal to MG Fine.

One model for particle sizing is known as Abrams' Median Particle-Size Rule. If we use Abrams' sizing rule, the median particle size for something expected to seal 20/40 sand should be ⅓ of 350μ or about 118μ. The median particle sizes for the MG grinds (75μ, 100μ, and 170μ) makes them nearer to the ideal size than any of the uintaites or natural asphalt additive.

The $D_{90}$'s for MG Fine, Medium, and Coarse are approximately 250μ, 350μ, and 600μ. Thus, the $D_{90}$ for MG Fine and MG Medium are equal to or less than the largest pore size for the 20/40 and 30/40 sand (470μ and 350μ) and therefore satisfy Hands' rule.

The uintaites and natural asphalts fluids tested all have a much smaller particle size distribution than the MG grinds while the CG grind has much larger particles. The uintaite and natural asphalt median particle sizes will be a good bit less than ideal in our tests according to Abrams' sizing rule. The median particle size for CG can be estimated to be around 550μ or much larger than Abrams' rule would recommend. Neither the uintaites, the natural asphalts nor CG would be expected to seal as well against the two sands as the MG grinds. This was borne out in the laboratory tests where the proprietary MG grinds of the present invention sealed as well or better than treated uintaite or untreated natural asphalt. CG did not seal at all. However, the uintaites and natural asphalts would be expected to seal formations with smaller pore sizes. Likewise, CG should seal formations with larger pore sizes and therefore might be suitable as a lost circulation material.

Figure 2:
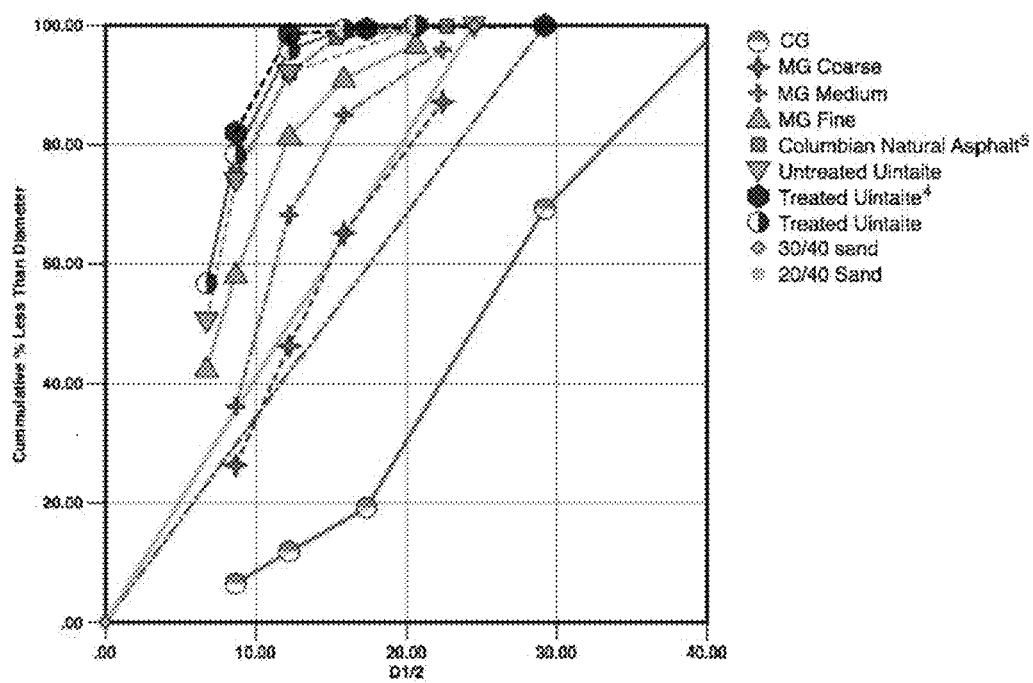
FIG. 2 is a graph or chart showing particle size distribution for various additives as a function of the square root of the diameter.

Another method used to evaluate the proper size distribution for particles to achieve sealing is the ideal packing theory (IPT). This theory says that "ideal packing occurs when the percent of cumulative volume vs. the $D^{1/2}$ forms a straight-line relationship, where $D^{1/2}$ is the square root of the particle diameter". See Dick et al., ibid. and Kaeuffer, M., "Determination de L'Optiumum de Remplissage Granulometrique et Quelques Proprietes S'y Rattachant", presented at Congres Internationa de l'A.F.T.P.V., Rouen, October 1973. FIG. 2 shows a plot of particle size distribution of some of the additives as a function of the square root of the particle size. The square root of the diameter is shown on the X axis. The cumulative % less than the diameter is shown on the Y axis. Again, additives with larger particle sizes are to the right and those with smaller particle size distributions are to the left.

FIG. 2 illustrates a graph or chart showing particle size distribution for various additives including those of the present invention, as a function of the square root of the diameter. FIG. 2 also includes lines for the calculated ideal maximum size particle for 20/40 sand (850μ, $D^{1/2}$=29μ) and 30/40 sand (600μ, $D^{1/2}$=24μ). These are the two straight lines starting at the origin and end at 29 and 24, respectfully. According to the IPT, ideally sized materials for sealing the sands would have a straight line section coinciding with these lines. As seen in FIG. 2, none of the materials fall exactly on the sand lines, but the MG grinds are closer than the additive.

Based on the particle size distribution in FIG. 2, the uintaites would be expected to be ideal for sealing porous rock with a maximum particle size around 125μ ($D^{1/2}$=11μ). Sand this size would pass through a 120 mesh screen. Likewise, MG Fine should be ideal for sealing formations with a maximum particle size around 250μ (pass through a 60 mesh screen, $D^{1/2}$=16μ). Theoretically, the MG Coarse comes closest to being ideal for sealing the two sands used in the tests. However, the total solid particle size distribution will be impacted by the presence of bentonite or drill solids.

As mentioned previously, calcium carbonate can be ground to a variety of sizes. For example, Global Drilling's Glo Carb™ comes in extra fine, fine, medium, and coarse grades with median particle sizes of 2-5μ, 10-14μ, 135-165μ, and 550-650μ, respectively. The fine material is used as a weighting agent, whereas the coarse and medium grades are used for bridging and seepage control. The MG grinds median particle sizes (~75μ, 100μ, and 170μ) are similar to Glo Carb medium while CG would be more similar to Glo Carb coarse.

Experimental Results:

Bentonite Drilling Fluids:

A series of tests were conducted using various MG grind in a simple 16.9 ppb bentonite drilling fluid and in a 22.5 ppb bentonite chrome lignosulfonate additives. These results were compared to similar tests of treated uintaite and treated Columbian natural asphalt. The results are summarized in a table shown in FIG. 13. The additives were added to the drilling fluids at a rate shown in the column "Additive, ppb."

1. Rheology: Standard viscosity measurements were taken after aging overnight at room temperature. The MG grinds do not appear to impact the properties of the 16.9 ppb fluid. Plastic viscosity, yield point and gel strengths were slightly higher for the MG Fine in the 22.5 ppb CLS than the base fluid.

2. Fluid Loss: Standard API (American Petroleum Institute) fluid loss tests (API-RP-13B) were conducted on a number of the drilling fluids. However, previous experience has shown that the standard API test does not adequately distinguish between fluids when being tested for sealing during drilling operations. Therefore, modified fluid loss tests as described in detail below were also conducted.

Figure 3:
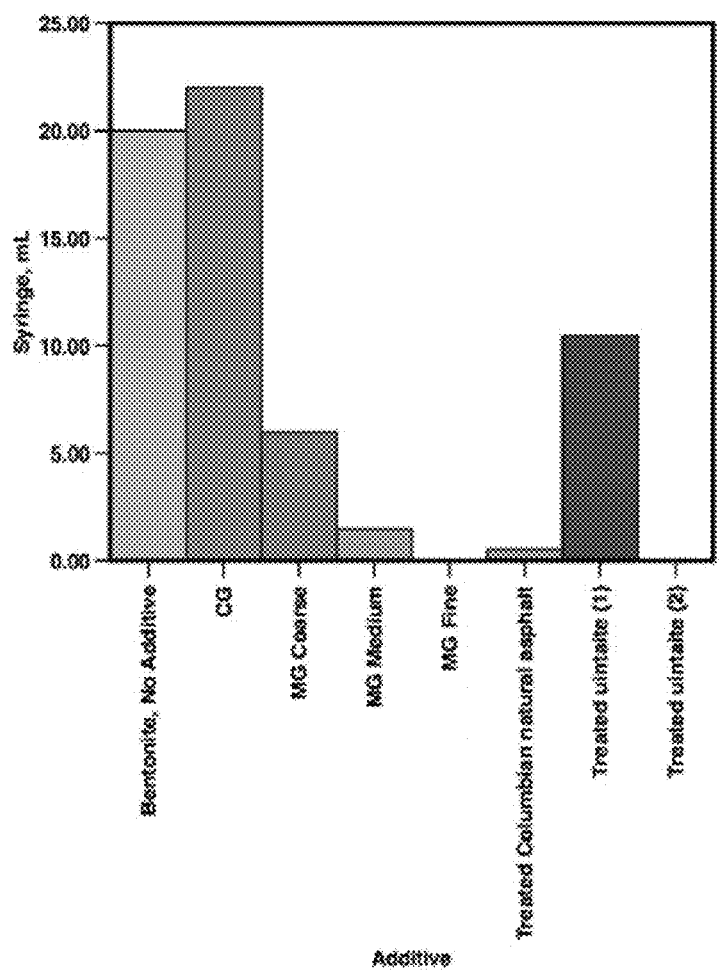
FIG. 3 is a graph or chart of fluid loss in a syringe fluid loss test in a bentonite drilling fluid system.

3. Syringe Test: FIG. 3 is a chart or graph of fluid loss in a syringe fluid loss test for various additives. In this test, 20/40 sand was placed in a 50 mL syringe. The test fluid was introduced at the top and pressure is applied to see how far the fluid travels in the sand and whether fluid comes through at the bottom. If fluid is expelled, the penetration is listed as 24 mL and the amount of fluid is measured. A detailed description of the test is given below.

In the 16.9 ppb bentonite drilling fluid, all the treated fluids exhibited complete penetration but differed as to the amount of fluid expelled. As shown in FIG. 3, the base fluid was essentially all expelled. The MG Fine grind gave excellent performance with no fluid expelled. One of the two treated uintaites tested also had no fluid expelled. As expected, the CG additive did not seal against the 20/40 sand.

Figure 4:
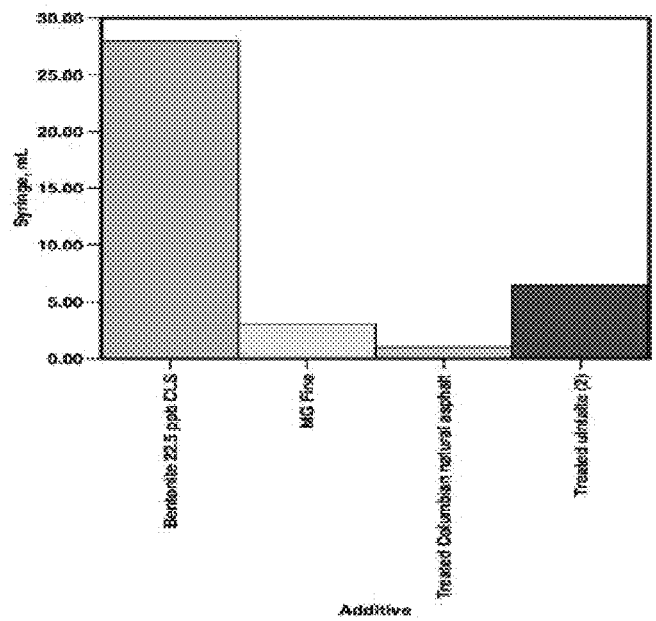
FIG. 4 is a graph or chart of fluid loss in a bentonite CLS drilling fluid system.

In the 22.5 ppb bentonite CLS fluid, the MG Fine, the treated Columbian natural asphalt, and treated uintaite all sealed, although the treated uintaite slightly less well than the other two products as seen in the chart or graph in FIG. 4.

Figure 5:
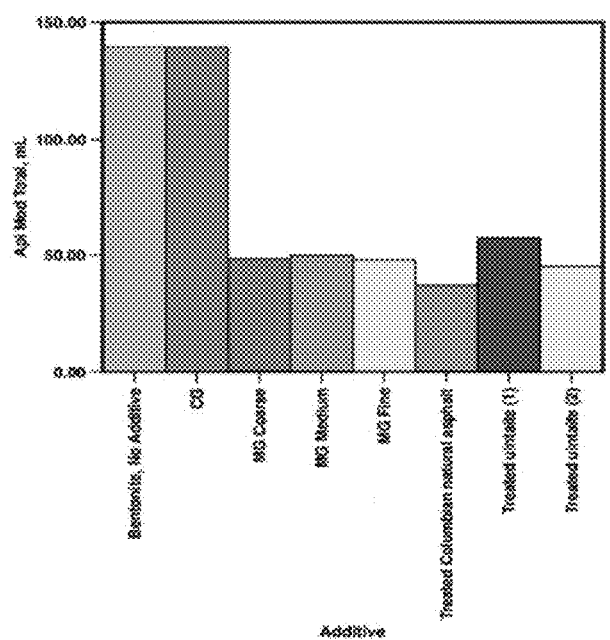
FIG. 5 is a graph or chart showing results of fluid loss in a modified API fluid loss test in a bentonite drilling fluid system.
Figure 6:
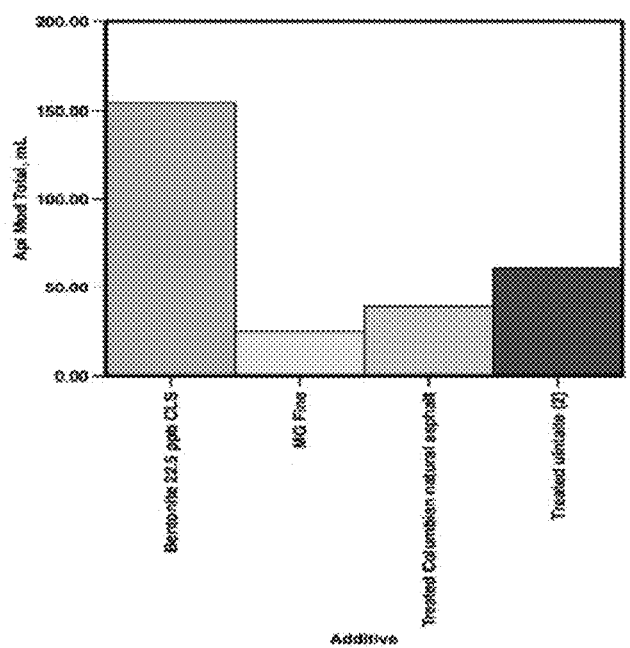
FIG. 6 is a graph or chart showing results of fluid loss in a modified API fluid loss test in a bentonite CLS drilling fluid system.

4. Modified API Fluid Loss: FIGS. 5 and 6 are graphs or charts illustrating results of fluid loss in a modified API fluid loss test for bentonite systems. In the modified API fluid loss test, the fluid loss is measured through a 1-inch bed of 30/40 sand instead of through filter paper. A detailed description is given below.

For the 16.9 ppb bentonite drilling fluid, the various MG grinds exhibited comparable performance to the Columbian natural asphalt and the treated uintaite samples. Again, the particle size range of the CG additive was too large for effective sealing for this sand size.

For the 22.5 ppb bentonite CLS fluid, the MG Fine additive gave the best performance with only 24.7 mL expelled compared to 39.5 mL treated Columbian natural asphalt, 61.5 mL for treated uintaite, and 154 mL for the base fluid.

X-C Polymer Systems:

Tests similar to those described above were performed on X-C polymer mud systems containing various MG grind additives and treated uintaite. The base drilling fluids contained 1.0 ppb X-C polymer, 5% KCl (potassium chloride), and 30 ppb RevDust to simulate drill solids. RevDust was added because previous work has shown that X-C polymer systems containing no drill solids do not seal well even with high product concentrations. RevDust is a clay material used as a substitute for drill solids encountered in actual operations. The results are shown in the table in FIG. 14.

1. Rheology: The X-C polymer drilling fluids showed no significant differences in plastic viscosity, yield point, or gel strengths with addition of any of the products.

2. Fluid Loss: The standard API fluid loss values of the X-C systems were essentially identical for the three products.

Figure 7:
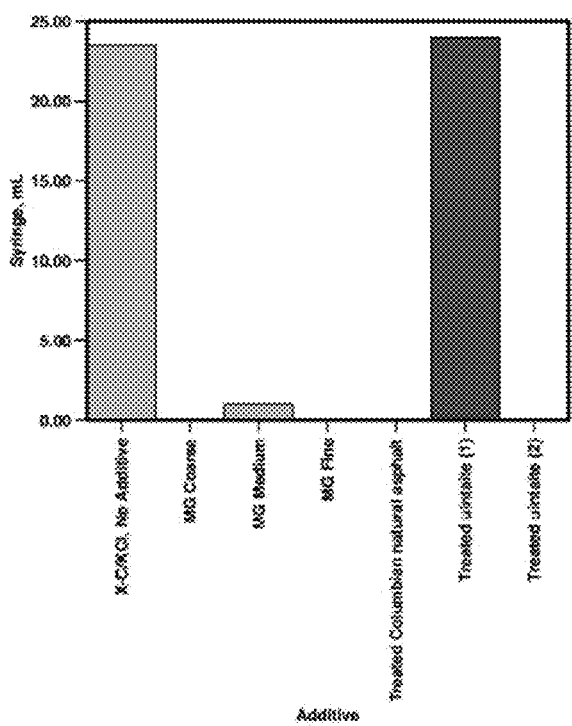
FIG. 7 is a graph or chart illustrating results of fluid loss in a syringe fluid loss test for a polymer/potassium chloride drilling fluid system.
Figure 8:
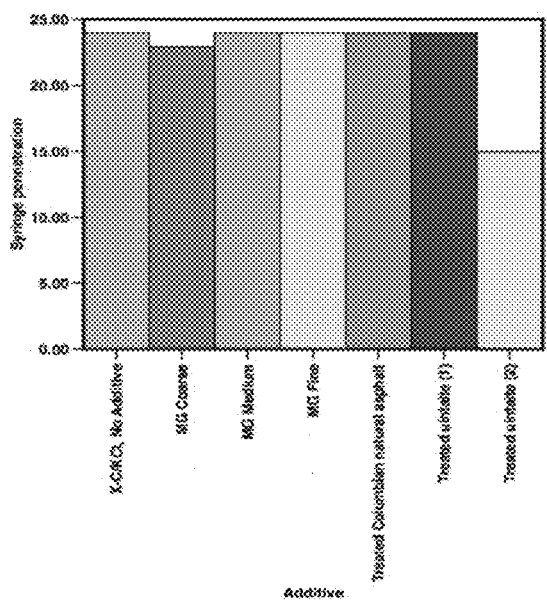
FIG. 8 is a graph or chart illustrating results of a syringe penetration test for a polymer/potassium chloride drilling fluid system.

3. Syringe Test: FIG. 7 is a graph or chart illustrating results of fluid loss in a syringe sand test for a polymer/potassium chloride system. The syringe test was performed on the fluids after aging overnight at room temperature. FIG. 7 shows the fluid expelled and FIG. 8 shows the syringe penetration. The base drilling fluid showed no sealing with complete penetration of the fluid and essentially all of the fluid being expelled.

As shown in the table in FIG. 8, the MG Coarse, the MG Medium, and the MG Fine additives sealed with little or no fluid expelled. The treated Columbian natural asphalt gave comparable results. The two treated uintaite samples gave different results. The first sample gave no sealing with all fluid being expelled. The second sample sealed with no fluid expelled and 15 mL of penetration.

Figure 9:
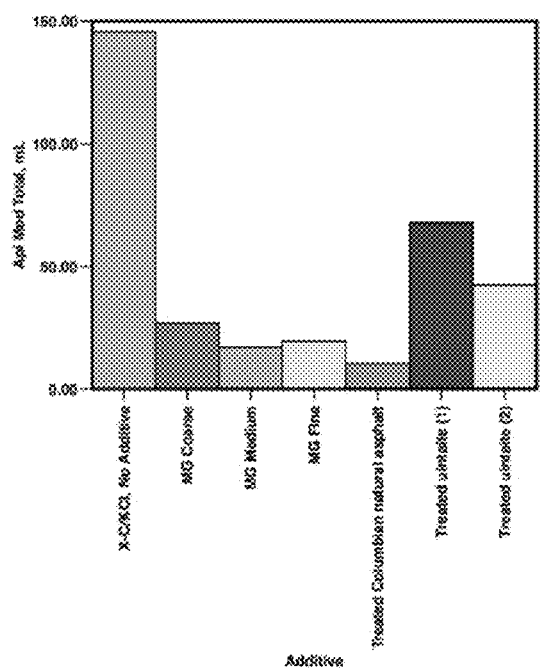
FIG. 9 is a graph or chart illustrating results of fluid loss in a modified API fluid loss test for a polymer/potassium chloride drilling fluid system.

4. Modified API Fluid Loss: FIG. 9 is a graph or chart illustrating the results of fluid loss in a modified API fluid loss test. The modified API fluid loss test in which the normal filter paper is replaced by a sand layer was conducted on the fluids. The untreated fluid showed essentially no sealing behavior. As shown in FIG. 9, the MG Coarse, MG Medium, and MG Fine were comparable in performance to the treated Columbian asphalt and performed considerably better than either sample of treated uintaite.

Oil-Based Drilling Fluid:

The MG Fine additive, untreated uintaite, and untreated Columbian natural asphalt were tested in an unweighted, 7.7 ppg diesel oil-based generic mud. The results are shown in the table in FIG. 15.

1. Rheology: The diesel fluids showed no significant differences in plastic viscosity, yield point, or gel strengths with addition of any of the products.

2. Fluid Loss: The standard API fluid loss values of the fluids were essentially identical for the tested products.

Figure 10:
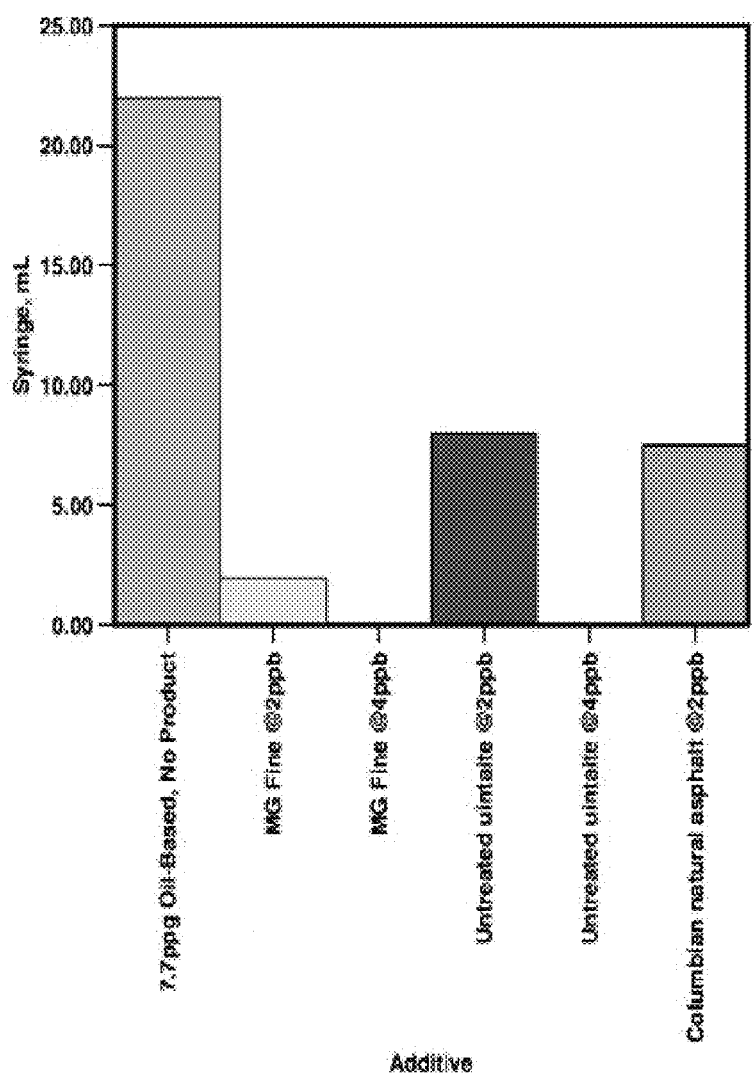
FIG. 10 is a graph or chart showing results of fluid penetration in a syringe fluid loss test in a diesel-oil based drilling fluid.
Figure 11:
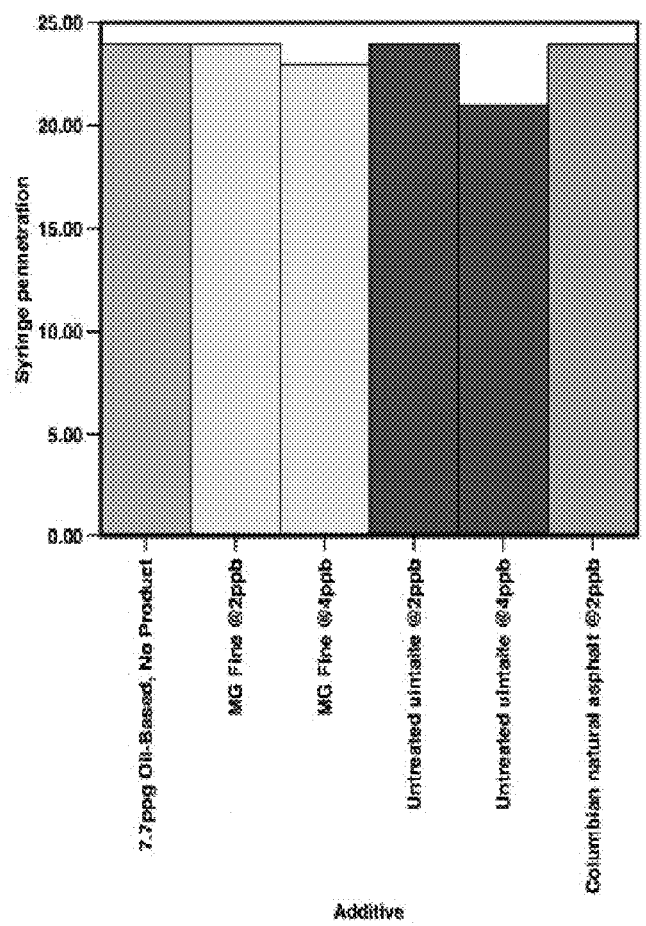

3. Syringe Test: FIGS. 10 and 11 are charts or graphs of fluid loss tests for various additives. At 2 ppb product, the MG Fine additive sealed better than either untreated uintaite or untreated Columbian natural asphalt. At 4 ppb, both the MG Fine additive and the untreated uintaite sealed with no fluid expelled. The untreated uintaite penetrated slightly less than the MG Fine additive. Results are shown in FIGS. 10 and 11. FIG. 10 illustrates the amount of fluid expelled and FIG. 11 gives the amount of fluid penetration.

4. Modified API fluid loss: As in the syringe test, MG Fine at 2 ppb sealed better than either untreated uintaite or untreated Columbian natural asphalt. For the latter two products, essentially all the fluid was expelled within the first 30 seconds. At 4 ppb, MG Fine allowed significantly less fluid to be expelled than the untreated uintaite. These results are shown in FIG. 12.

Experimental Procedures:

Bentonite Drilling Fluids:

All of the drilling fluids contained water and bentonite. The base bentonite fluid was mixed on a Hamilton Beach™ multimixer for 5 minutes, scraped down and mixed an additional 10 minutes. The fluid was combined with additional samples and aged overnight. The base fluid was mixed with a paint mixer after aging. The additives were then added to individual lab barrels while mixing on the multimixer. The fluids were mixed for 5 minutes, scraped down and mixed an additional 10 minutes. The pH was adjusted to about 10 using 1 N KOH. The fluids were aged overnight at room temperature and rheologies measured after mixing 5 minutes and adjusting pH again. Rheologies were measured on an Ofite Model 900 rheometer at room temperature.

X-C Polymer/5% KCl Drilling Fluids:

To make the base fluid, 350 g of 5% KCl in distilled water was added to a mixer cup. 1.0 gram X-C Polymer was slowly added to the cup while mixing on the multimixer, and then 30 grams of RevDust added with mixing. After 20 minutes on the multimixer, the appropriate amount of the product of interest was added slowly and mixed for 10 minutes. The pH was adjusted to about 10 with 1 N KOH solution. The samples were aged overnight. After aging, each sample is mixed 5 minutes and the pH readjusted before the rheological properties are measured and the fluid loss tests performed.

Oil-Based Drilling Fluid:

The diesel oil-based drilling fluid was a generic unweighted fluid provided by Intertek Westport Technology Center, 6700 Portwest Drive, Houston Tex. 77024. After product addition, the samples were aged overnight at room temperature.

Syringe Test:

Place 45 grams of 20/40 sand in a 60 mL plastic syringe. Tap the syringe with the syringe top, and then tap the tip on the lab bench top to settle the sand which will come to about the 25 mL mark on the syringe barrel. Pour the fluid to be tested gently into the syringe so as not to disturb the surface of the sand fill to about the 53 mL mark. Insert the plunger. Hold the syringe and a 25 mL graduated cylinder with both hands so the tip of the syringe is in the neck of the graduated cylinder. Place the top of the plunger under a sturdy table top and push the barrel up with both hands with as much force as possible. When liquid stops flowing from the tip, release the pressure and measure the fluid collected in the graduated cylinder. If no liquid passes through the sand column, note the distance (in mL marks) from the top of the sand column to the level to which the liquid penetrated.

Modified API Test Using a Sand Bed:

In the standard API fluid loss cell, pour 200 grams of 30/40 sand onto the screen at the bottom of the cell. Tap the side of the cell with a rubber mallet with some vigor to settle the sand. Ensure that the surface of the sand is level but do not touch the surface. Pour 200 mL of the fluid to be tested slowly and gently through a fine metal screen suspended about 0.5 cm above the sand surface—do not let the screen touch the surface while pouring the liquid. (The screen is cut to fit inside the API cell with three fine wires attached to form a handle by which the screen can be held above the sand and then gently withdrawn from the cell.) Do not let the screen touch the surface while pouring the liquid. The goal is to disturb the sand surface a minimum amount. Assemble the cell as normal. Place a 250 mL beaker below the cell to catch effluent. Slowly open the valve to the cell to bring the pressure in the cell to 100 psi. When liquid begins to exit the cell or the valve is fully open, start the 30 second timer. If the tested material forms a seal, only part of the liquid contents will be expelled in the 30 second period. Change the beaker for another one and start the 30 minute timer. Measure the volumes for both parts of the tests as normal.

In summary, the present invention directed to an additive of bituminous coal having a selected particle size distribution and a median particle size added to drilling fluid at a selected rate has proved to be an effective sealing agent to reduce seepage loss and fluid loss in subterranean wellbores.

In view of the foregoing, it is proposed to employ an additive for drilling fluid for mud grade coarse grind applications of ground bituminous coal having a selected particle size distribution of approximately 25% of its particles less than 75 microns and a median particle size of around 170 microns.

It is further proposed to employ a mud grade medium grind additive wherein the selected particle size distribution of the bituminous coal has approximately 35% of its particles less than 75 microns and a median particle size of about 100 microns.

It is further proposed to employ a mud grade fine grind additive wherein the selected particle size distribution of the ground bituminous coal has approximately 50% of its particles less than 75 microns and a median particle size of around 75 microns.

The present invention will maximize reduction in seepage loss and fluid loss while minimizing the additives to the drilling fluid.

Whereas, the present invention has been described in relation to the drawings attached hereto, it should be understood that other and further modifications, apart from those shown or suggested herein, may be made within the spirit and scope of this invention.

What is claimed is:

1. A drilling fluid comprising an additive used as a sealing agent to reduce seepage and fluid loss in subterranean wellbores, which additive comprises:
    a fluid additive comprising ground bituminous coal having a selected particle size distribution wherein the selected particle size distribution of the ground bituminous coal has approximately 50% of its particles less than 75 microns and a median particle size of 75 microns; and
    wherein said fluid additive is added to drilling fluid at a rate of between 3 to 6 pounds per barrel.

2. The drilling fluid as set forth in claim 1 wherein the drilling fluid is bentonite based.

3. The drilling fluid, as set forth in claim 1 wherein the drilling fluid is polymer/potassium chloride based.

4. The drilling fluid as set forth in claim 1 wherein the drilling fluid is diesel-oil based.

5. A method to reduce seepage and fluid loss in subterranean wellbores, which method comprises:
    preparing a fluid additive comprising ground bituminous coal having a selected particle size distribution, wherein the selected particle size distribution of the ground bituminous coal has approximately 50% of its particles less than 75 microns and a median particle size of about 75 microns;
    adding the fluid additive to a drilling fluid at a rate of between 3 to 6 pounds per barrel; and
    injecting the drilling fluid with fluid additive downhole in a subterranean wellbore.

6. The method to reduce seepage and fluid loss as set forth in claim 5 wherein the drilling fluid is bentonite based.

7. The method to reduce seepage and fluid loss as set forth in claim 5 wherein the drilling fluid is polymer/potassium chloride based.

8. The method to reduce seepage and fluid loss as set forth in claim 5 wherein the drilling fluid is diesel-oil based.

* * * * *